April 28, 1959 M. DEN HERTOG 2,884,489
ELECTRICAL IDENTIFICATION OR SELECTION EQUIPMENT
Filed May 13, 1954 3 Sheets-Sheet 1

Inventor
M. DEN HERTOG
By
Attorney

April 28, 1959 M. DEN HERTOG 2,884,489
ELECTRICAL IDENTIFICATION OR SELECTION EQUIPMENT
Filed May 13, 1954 3 Sheets-Sheet 2

*Inventor*
M. DEN HERTOG
*Attorney*

2,884,489

ELECTRICAL IDENTIFICATION OR SELECTION EQUIPMENT

Martinus Den Hertog, Antwerp, Belgium, assignor to International Standard Electric Corporation, New York, N.Y., a corporation of Delaware Application May 13, 1954, Serial No. 429,624

Claims priority, application Great Britain May 29, 1953

7 Claims. (Cl. 179—18)

This invention relates to selector equipment of the type used in automatic telecommunication exchanges in which each selector gives access to a number of groups of outlets leading in different directions.

The object of the invention is to provide a novel and economical form of selector test circuit in which a simultaneous test is made of all the outlets of a wanted group and which is particularly useful for controlling the setting of coordinate selector switches of large capacity, although not limited in its application thereto.

The main feature of the invention comprises selector equipment comprising a number of groups of outlets characterised by test equipment permanently and operatively connected to all said groups of outlets, inhibiting means for preventing the operation of said test equipment as respects all said groups, and selective means for inhibiting the operation of all said groups except one whereby said one group of outlets alone will be tested.

The invention will be described with reference to Figs. 1 to 3 which show different circuits illustrating the invention, and in which.

Figure 1:
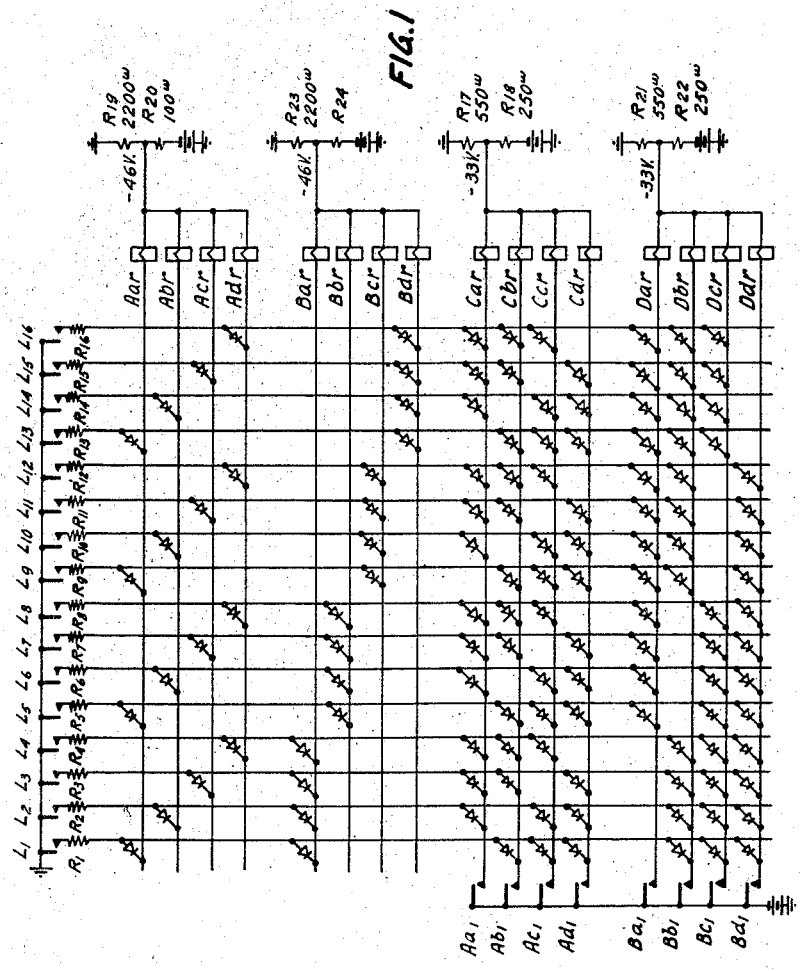
Fig. 1 shows an arrangement in which sixteen different electrical circuits may be identified by two groups of four relays each.

Figs. 1 shows an arrangement in which sixteen different electrical circuits may be identified by two groups each of four relays, denominated A$ar$ to A$dr$ and B$ar$ to B$dr$ respectively. Each of these relays carries a contact A$a_1$ to A$d_1$ and B$a_1$ to B$d_1$ respectively, which contacts serve for the operation of auxiliary relays C$ar$ to C$dr$ and D$ar$ to D$dr$ respectively, of which the functions have not been represented on the drawing. Moreover these contacts fulfill a second purpose which will now be explained:

Resistances $R_1$ to $R_{16}$ are inserted in each of the leads from the different electrical circuits to be identified, so that the relays A$ar$ to A$dr$ and B$ar$ to B$dr$ have to operate in series with these resistances. The make contacts of these relays are connected via rectifiers for each relay in such a manner that when the relay operates a battery will be connected to each lead from the different resistances associated with the electrical circuits for which the relay in question must not operate. For example, the make contact of relay A$ar$ which operates for electrical circuits Nos. 1, 5, 9 and 13 will apply a battery via one rectifier each to the resistances of all remaining electrical circuits. The purpose of this is to avoid the operation of more than one relay in each group in case more than one of the electrical circuits were to close their contacts simultaneously or successively. For example, assuming that electrical circuits Nos. 1 and 2 were to close their contacts $L_1$ and $L_2$ respectively, circuits would be closed via resistances $R_1$ and $R_2$ for the operation of relays A$ar$ and A$br$. Relay A$ar$, by operating, now applies battery to resistance $R_2$, thereby preventing the operating of relay A$br$, and reciprocally A$br$, by operating, applies battery to resistance $R_1$, thereby preventing the operation of relay A$ar$. In practice the result of this arrangement will be that only one of the two relays will operate and keep the other short-circuited which means that only one of the two circuits that have their contacts closed will be identified. It will be seen that, in the example referred to, the two circuits cause the same relay to operate in the second group, viz: relay B$ar$, so that when either A$ar$ or A$br$ succeeds in operating definitely and prevents the other one from operating, this operated relay together with B$ar$ will indicate either the closure of contact $L_1$ or $L_2$, depending on whether A$ar$ or A$br$ succeeded in operating.

It will be seen in a similar manner that when e.g. electrical circuits Nos. 1 and 5 close their contacts $L_1$ and $L_5$ simultaneously, they both cause the operation of relay A$ar$, but that they will attempt to operate different relays of the second group, viz: B$ar$ or B$br$. Also these relays have their make contacts so connected that they apply battery to the resistances of all electrical circuits for which they must not operate and accordingly, also only one of the second group of relays at a time may finally succeed in remaining operated.

A particular case now arises when two electrical circuits close their contacts simultaneously that cause different relays to operate in both groups. For example, when circuits Nos. 1 and 6 close their contacts $L_1$ and $L_6$ simultaneously, relays A$ar$ and B$ar$ will attempt to operate for circuit No. 1, and relays A$br$ and B$br$ for circuit No. 6. From what has been said above, it will now be clear that in each group finally only one relay will remain operated, but it could be assumed that the two relays that remain operated in the two groups do not correspond to either of the two electrical circuits which closed its contact. For example, if in the first group relay A$ar$ succeeded in operating and in the second group relay B$br$ succeeded in operating, the combination of operated relays A$ar$ and B$br$ would not correspond to either of electrical circuits No. 1 or 6, but to circuit No. 5. In reality this cannot happen because it will be seen that if these two relays were actually operated, they would also short circuit one another. The circuit for relay B$br$ may be traced from battery to make contact A$a_1$ and via the rectifier which leads to resistance $R_6$. The battery connected to resistance $R_6$ in this way will prevent operating current from flowing through the winding of relay B$br$. On the other hand, if B$br$ were operated, battery would be connected from make contact B$b_1$ via the rectifier leading to resistance $R_1$, which has the effect of preventing operating current from flowing through the winding of A$ar$. It will, therefore, be seen that such a wrong combination of relays, even if it would succeed in operating momentarily, could not remain operated, as such relays would always short circuit one another. The final result will be that a combination definitely succeeds in operating which corresponds to one of the two electrical circuits having their contacts closed. For example, if in the example assumed above, in which contacts $L_1$ and $L_6$ were assumed to be closed, relays A$ar$ and B$ar$ finally succeed in operating, these two relays will prevent the operation of relays A$br$ and B$br$ and by their operated condition would indicate the identity of electrical circuit No. 1. It will be seen that with relay A$ar$ and B$ar$ operated, neither of these two relays is short circuited by the other.

It is also possible in the case assumed that finally relays A$br$ and B$br$ succeed in operating, in which case they keep relays A$ar$ and B$ar$ short-circuited and do not short circuit one another. The operated condition of these two relays by their combination indicates electrical circuit No. 6.

It will be seen that the two groups of relays A$ar$ to A$dr$ and B$ar$ to B$dr$ are not connected to full battery potential, but to a potential divider $R_{19}$, $R_{20}$ and $R_{23}$, $R_{24}$ respectively, which provides a potential of some 2 v. below the full battery potential which is assumed to be —48 v. The purpose of this is to take care of a drop of potential arising in a rectifier when a circuit is closed through it to short circuit one of these relays. For example, in the case assumed above with contacts $L_1$ and $L_2$ closed and relay A$ar$ operated, battery will be closed from make contact A$a_1$ via rectifier to resistance $R_2$ and a drop of potential of between 1 and 2 v. will occur in this rectifier, so that the potential prevailing on the lead between the rectifier and the resistance is something between —46 v. and —47 v. By connecting the relay A$br$ to —46 v. the potential at the two ends of its winding will be approximately equal or there may be a small difference of potential in the direction opposite to that applied for its operation. This will tend to release the relays very rapidly in case two or more of them should have operated in the same group.

The auxiliary relays C$ar$ to C$dr$ and D$ar$ to D$dr$ are equally connected to a potential divider $R_{17}$, $R_{18}$ and $R_{21}$, $R_{22}$ respectively, of which the purpose is to reduce the potential normally prevailing on the rectifiers, so that a single disc may be used for each rectifier shown.

Figure 2:
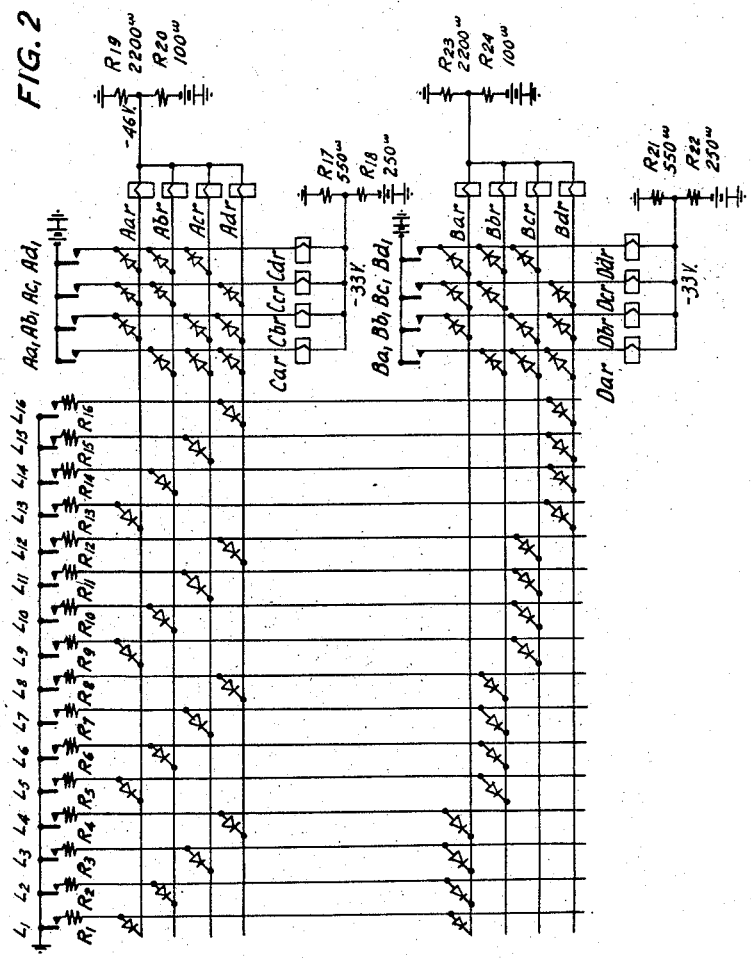
Fig. 2 shows a modification of Fig. 1.

Fig. 2 shows an alternative to Fig. 1, in which the battery applied from make contacts A$ar$ to A$dr$ and B$ar$ to B$dr$ is not applied via rectifiers to the resistances provided for each of the electrical circuits, but is provided directly to the windings of the other relays of the same group. Thus, make contact A$a_1$ via three rectifiers will connect battery, when operated, to relays A$br$, A$cr$ and A$dr$. In such a manner each relay will prevent the others of the same group from operating. The effect of this arrangement is the same as for the arrangement shown in Fig. 1, and it may be shown that, when two or more electrical circuits close their contacts simultaneously or consecutively, only a single relay in each group will finally succeed in remaining operated in a combination that indicates one of these electrical circuits closed its contact.

As compared with Fig. 1, Fig. 2 uses fewer rectifiers for the purpose of preventing more than one relay to operate in each group. However, it should be pointed out that the current which has to be carried by each of these rectifiers is much larger in Fig. 2 than in Fig. 1. In Fig. 1 the maximum current that may pass through each of the rectifiers connected to the make contacts A$a_1$, etc. is that which flows through one of the resistances $R_1$ to $R_{16}$. Even if all of the electrical circuits were to close their contacts simultaneously, each rectifier in Fig. 1 would have to carry a maximum of the full current passing through one resistance only. This is different with Fig. 2, which may be seen as follows:

Assuming that all contacts $L_1$ to $L_{16}$ were to be closed and that in each group of relays only one would be operated, e.g. A$ar$ and B$ar$, then, in order to prevent all other relays from operating, batteries should be so connected that the ground potential connected at all of the contacts $L_1$ to $L_{16}$, except one, is absorbed in the fifteen corresponding resistances. The current flowing through fifteen resistances has therefore to be furnished through a total of six rectifiers, which are connected to make contacts A$a_1$ and B$a_1$ respectively, and each of these rectifiers, therefore, has to carry a current two-and-a-half times larger than in the case of Fig. 1. This fact assumes particular importance when the number of electrical circuits becomes higher. For example, in case there are 100 electrical circuits to be distinguished, this may be done by three groups of relays comprising 5, 5 and 4 relays respectively. The make contacts of each relay of the first two groups would be connected to four rectifiers each to shunt the four other relays of the group. The make contact of the relays of the third group would be connected to three rectifiers each to shunt the three other relays of the group. Therefore, for any combination of relays operated, having one operated relay in each group, a total of 4+4+3=11 rectifiers would be used to prevent all other relays from energising. Assuming now that all 100 circuits were to close their contacts simultaneously, then the current through 99 resistances would have to be furnished through these eleven rectifiers, which would amount to a current nine times higher than required with the arrangement shown by Fig. 1.

When using Fig. 2, therefore, it is necessary to use large size rectifiers which are capable of carrying this current. The rectifiers connected in Fig. 2 directly to the resistances $R_1$ and $R_{16}$ may be of smaller size, because the maximum current they need to carry is that which flows through one resistance only. The value of the resistance is determined principally by the size of rectifiers that are connected to them. In practice it has been found possible to operate the circuit according to Fig. 2 employing rectifiers connected directly to the resistances with a maximum current carrying capacity of 10 ma. This determines the value of the resistance, since this must be so high that when practically the full battery potential has to be absorbed by this resistance in series with a rectifier, the current does not exceed 10 ma. Accordingly with a 48-v. battery potential, the value of resistances $R_1$ to $R_{16}$ may be fixed at approximately 5000 w. It therefore becomes necessary to use for the relays operating in series with these resistances, a rather sensitive type of which several may operate in parallel via a single resistance of 5000 w. For example, in the case mentioned above, where 100 different electrical circuits have to be distinguished, three of these relays in parallel must be capable of operating in series with a common resistance of 5000 w. Another requirement for these relays is that they have no follow contact. It has been found that by using relays providing a single rigid make contact without follow, the time during which more than one relay may be operated in a group is very considerably reduced, compared with relays having follow contacts. This may be explained as follows:

Assuming that two or more relays in a group were to be operated simultaneously, all of these relays would be short-circuited by one another and would tend to release. It may now be assumed that the relays release successively with very short intervals. So long as two or more relays hold their make contacts closed, all relays remain short circuited. At the moment the last but one relay opens its make contact, the last relay remaining operated will immediately receive the full operating current again. When now this relay has no follow contact, its armature at this moment cannot yet be in motion, and accordingly, by receiving the full current, it will hold its contact closed definitely without moving. If it were assumed, however, that these relays were provided with a follow contact, the armature of the relay holding its contact closed last, at the time the last but one contact opens, might already be moving backwards before its contact opens and in this case the inertia of the armature will tend to let this backward movement continue for a moment, even whilst the circuit is already reclosed through the winding. In consequence of this, the contact of the last operated relay might also open, permitting all other relays to receive current again, and it will easily be seen that in this way the period during which relays may operate and release in rapid succession may continue for a longer time than in the case the contacts are provided with a rigid make contact. It has actually been found by tests that relays having sufficient sensitivity to operate with the currents prevailing in the circuit and provided with a rigid make contact, would reduce this period to something of the order of 5 ms. and none of the relays except that remaining operated definitely would be able to energise its auxiliary relay during this period.

Figure 3:
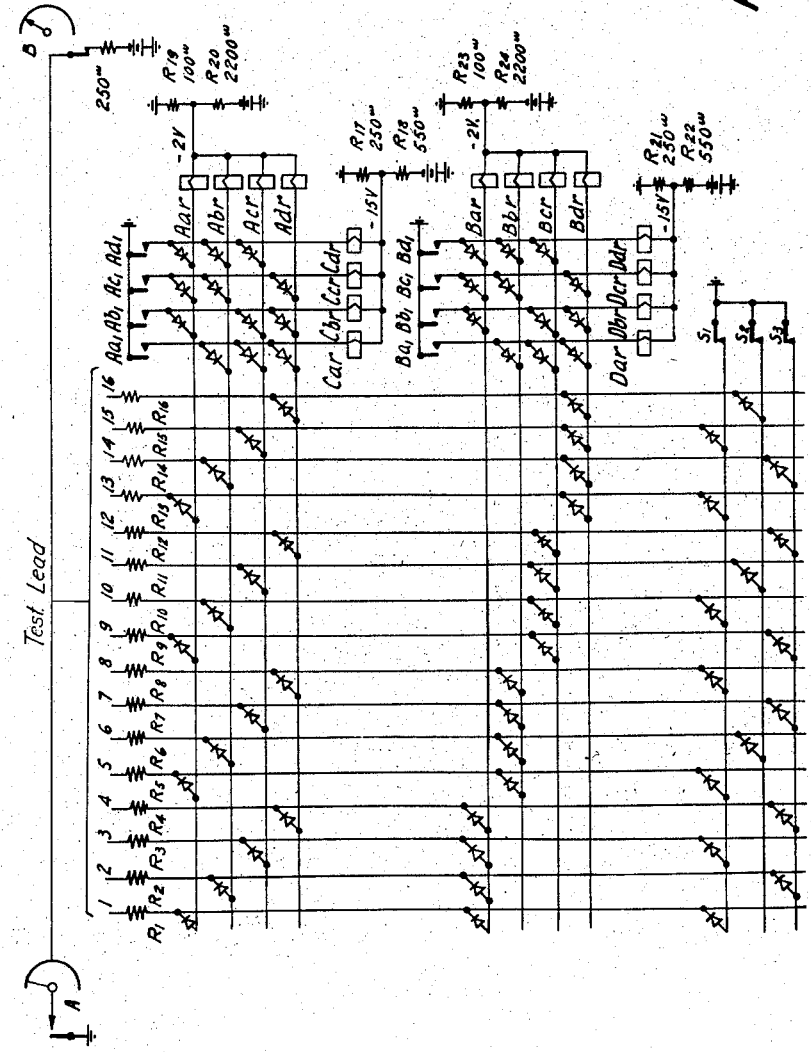
Fig. 3 shows a group selector circuit based on Figs. 1 and 2.

Fig. 3 is similar to Fig. 2. The electrical circuits in this figure are constituted by test leads such as are employed in telecommunication exchange systems to signal the busy or free condition of the outlets of one selector in a selector stage (e.g. that indicated by B on the drawing) to the selectors of the preceding selector stage (e.g. that indicated by A on the drawing).

When a selector in stage B is free, negative potential will prevail on the test lead connected to the multiples of the selectors in stage A. When a selector in stage B is engaged by a selector in stage A, the latter will connect ground potential to the test lead. Each of the test leads is connected according to the drawing, to one of the resistances $R_1$ to $R_{16}$, although it should be mentioned that the number of these resistances should be equal to the number of test leads connected in a group of selectors. Since battery potential is used to indicate the free condition of a selector in stage B, this battery potential will be used in order to operate a combination of relays via the rectifier matrix. It should be understood that the selectors of stage B may be divided into a number of different groups and that the object of the circuit is to select a free circuit of one of these groups. For this purpose the circuit shows in addition to the rectifier matrices, already represented in Fig. 2, another array of matrices connected to contacts $S_1$, $S_2$, $S_3$, which normally connect a ground via these rectifiers to all of the resistances $R_1$ to $R_{16}$. Owing to this, none of the relays is able to operate, in spite of the presence of free test potentials, so long as all contacts $S_1$ to $S_3$ are closed. In order to effect the selection of a free circuit from a predetermined group, one of these contacts, corresponding to the wanted group, is opened, so that thereby the short circuit on a number of relays is removed. It should be understood that the total number of test leads connected in selector stage A may be divided arbitrarily in any different number of groups and that each group may comprise any number of circuits within the total capacity provided by the selector arcs at stage A.

The drawing shows arbitrarily that seven out of the sixteen circuits are associated with group 1 and are controlled by contact $S_1$, three of the circuits are associated with group 2 and are controlled by contact $S_2$ and the remaining six circuits constitute group 3 and are controlled by contact $S_3$. The manner in which the different circuits are divided is completely arbitrary. Assuming that contact $S_1$ opens, the test leads from which this contact removes the ground, may now try to operate a combination of relays and one of these will be successful and cause the relays to operate in a combination indicating this successful circuit. It will be evident that only free circuits on which test potential is present will be able to cause the relays to operate and it is also evident that none of the circuits except one of the selected group is able to do so. The combination of relays operated may now be used to direct a selector in stage A to a corresponding set of terminals to which the selected test lead and the corresponding selector in stage B are connected.

Other suitable types of two-position potential-responsive devices can replace the electro-magnetic light-current contact-making relays used in all the embodiments described.

While the principles of the invention have been described above in connection with specific embodiments and particular modifications thereof, it is to be clearly understood that this description is made only by way of example and not as a limitation on the scope of the invention.

What I claim is:

1. Selector equipment comprising a number of groups of outlets, test equipment permanently and operatively connected to all said groups of outlets, inhibiting means connected to said outlets for preventing the operation of said test equipment, and selective means for operating said inhibiting means to inhibit the operation of said test equipment connected to all said groups except the group selected by said selective means, whereby said group of outlets alone will be tested, said test equipment comprising a plurality of detector devices each of which is permanently connected to all the outlets of a different group, means for applying an electrical condition to any one of said outlets to indicate that it is idle, each detector device being responsive to said electrical condition applied to an outlet of the group to which it is connected when the outlets of that group are free of the inhibiting condition, whereby a detector device characteristic of a group of outlets having an idle outlet will operate, and the inhibiting means comprises lock-out equipment controlled by said operated detector device for preventing simultaneous effective operation of detector devices characterizing other groups of outlets.

2. Selector equipment, as claimed in claim 1, further comprising additional test equipment permanently and operatively connected to all the outlets in all the groups of outlets, additional inhibiting means connected to all said outlets for preventing the operation of said additional test equipment, and additional selective means for operating said additional inhibiting means to inhibit the operation of said additional test equipment, said additional inhibiting means connected to all the outlets of said groups except one outlet in each group selected by said additional selective means, whereby the selected outlet in the selected group will be tested.

3. Selector equipment, as claimed in claim 2, in which the additional test equipment comprises a plurality of detector devices each of which is permanently connected to different corresponding outlets in the groups of outlets, means for applying an electrical condition to any one of said outlets to indicate that it is idle, each additional detector device being responsive to said electrical condition applied to an outlet to which it is connected when the outlets of that group are free of the inhibiting condition, whereby an additional detector device characteristic of an idle outlet in one of said groups will operate, and the additional inhibiting means comprises lock-out equipment controlled by said operated additional detector device for preventing simultaneous effective operation of additional detector devices characterizing other outlets in the groups.

4. Selector equipment, as claimed in claim 1, in which the connection between the test equipment and the outlets comprises a test conductor per outlet forming a first set of conductors, a second set of conductors, said test equipment comprising a plurality of detector devices connected to an equal number of conductors of said second set; a plurality of unidirectional current-carrying devices each interconnecting a pair of conductors comprising one conductor from each set, said pairs of conductors being so chosen that the detector devices so connected to each conductor of the first set identify the group of said conductor, a third set of conductors one per each group of outlets, and unidirectional current-carrying devices interconnecting each third set conductor to all the first set conductors of the other groups, switching means individual to each conductor of the third set, said inhibiting means comprising circuits for applying inhibiting electrical conditions to all said third set of conductors via said switching means for selectively applying and removing said inhibiting condition to and from said third conductors.

5. Selector equipment, as claimed in claim 4, in which each detector device comprises a high-speed, low-inertia, light-current relay having a pair of rigid make contacts with a gap up to ten mils in length, a second relay operable by said high-speed relay for controlling an output circuit, and contacts controlled by said high-speed relay for applying inhibiting connections each including a unidirectional current-carrying device to other of said high-speed relays.

6. Selector equipment, as claimed in claim 5, further comprising power supply equipment having a voltage higher than that which each said unidirectional current-carrying device will carry without breakdown, and potentiometer means for adjusting the potential applied from said power supply equipment to each said unidirectional current-carrying device to safe value, whereby an economical form of unidirectional current-carrying device can be used.

7. Selector equipment comprising a plurality of groups of outlets, a first set of conductors, there being one for each outlet, a second set of conductors, there being one for each group of outlets, a third set of conductors, there being one for each outlet in a group, a plurality of detector devices, there being one for each of the conductors in said second and third sets, said devices being connected respectively to said second and third conductors, a fourth set of conductors, there being one for each group of outlets, a fifth set of conductors, there being one for each outlet in a group, a first plurality of unidirectional current-carrying devices, there being one for each of said conductors of said first set, each interconnecting a conductor of said first set with a conductor of said second set corresponding to the group containing said conductor of said first set, a second plurality of unidirectional current-carrying devices, there being one for each conductor of said first set, each interconnecting a conductor of said first set with a conductor of said third set corresponding to the position in the group of said conductors of said first set, a third set of unidirectional current-carrying devices, there being one less than the number of groups of outlets for each conductor of the first set, each interconnecting its associated conductor of the first set with a conductor of the fourth set other than that corresponding to the group containing said conductor of the first set, a fourth set of unidirectional current-carrying devices, there being one less than the number of outlets in a group for each conductor of said first set, each interconnecting its associated conductor of the first set with a conductor of the fifth set other than that corresponding to the position in the group of said conductor of the first set, and means controlled by each of said detector devices for applying a potential to the corresponding conductor of said fourth or fifth set to short circuit the other detector devices associated with the same set of conductors.

References Cited in the file of this patent
UNITED STATES PATENTS

| | | |
|---|---|---|
| 1,545,025 | Anspach | July 7, 1925 |
| 2,270,123 | Horn | Jan. 13, 1942 |
| 2,270,128 | Langer et al. | Jan. 13, 1942 |
| 2,270,129 | Langer | Jan. 13, 1942 |
| 2,292,977 | Taylor et al. | Aug. 11, 1942 |
| 2,338,242 | Haigh | Jan. 4, 1944 |
| 2,532,718 | Hecht | Dec. 5, 1950 |
| 2,691,151 | Toulon | Oct. 5, 1954 |
| 2,729,705 | Faulkner | Jan. 3, 1956 |
| 2,787,666 | Flood | Apr. 2, 1957 |